G. L. BROWN.
TOOTH BRUSH.
APPLICATION FILED JUNE 20, 1916.
1,212,010.
Patented Jan. 9, 1917.
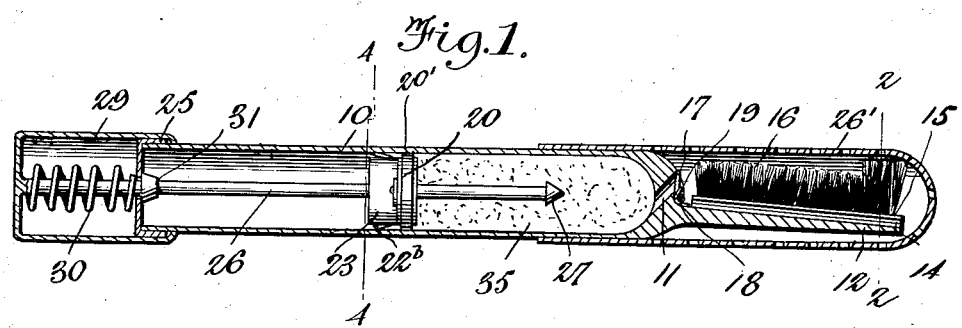
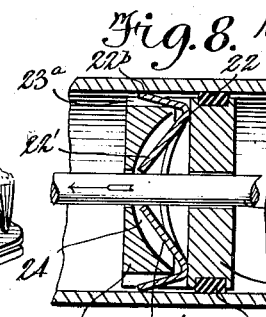
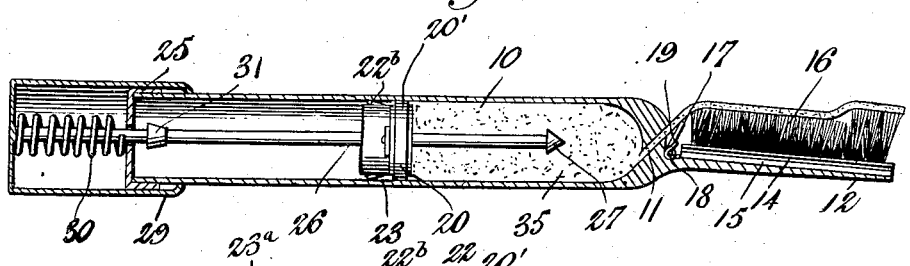
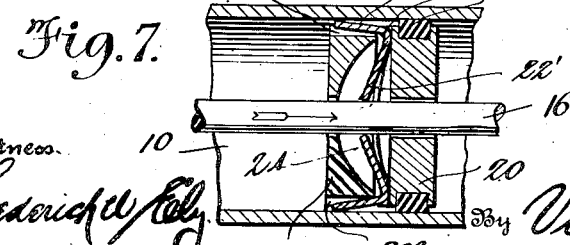
Inventor
George L. Brown.
By Victor J. Evans
Attorney

UNITED STATES PATENT OFFICE.

GEORGE L. BROWN, OF PLANT CITY, FLORIDA.

TOOTH-BRUSH.

1,212,010.   Specification of Letters Patent.   Patented Jan. 9, 1917.

Application filed June 20, 1916. Serial No. 104,764.

*To all whom it may concern:*

Be it known that I, GEORGE L. BROWN, a citizen of the United States, residing at Plant City, in the county of Hillsborough and State of Florida, have invented new and useful Improvements in Tooth-Brushes, of which the following is a specification.

This invention relates to tooth brushes.

In carrying out my invention it is my purpose to produce a tooth brush wherein the handle comprises a hollow casing and provides a receptacle for the tooth paste, the said handle having one of its ends formed with a port that is normally closed by a valve, whereby when said valve is moved to its open position, the paste will be delivered through the port over the edge of the brush, means being provided within the casing and operative from the exterior thereof for forcing the paste in predetermined quantities through the port and over the brush.

It is also my purpose to construct a fountain tooth brush wherein the handle comprises a hollow member forming a receptacle for the tooth paste and which has one of its ends provided with an angularly disposed port that is normally closed by a spring pressed valve, the said casing having its valved end provided with an extension to receive a removable brush, a plunger member being arranged in the casing to force the paste toward and through the port, when the valve is open, a clutch member being associated with the plunger for preventing the movement of said plunger in a direction away from the port and said plunger and clutch member being operated from the outer end of the casing whereby the plunger may be advanced a predetermined distance in the casing upon the actuation of said operative means so that a determined quantity of paste will be ejected through the outlet port and forced over the bristles of the brush.

It is a further object of the invention to produce an article of this character which shall embody the desirable features of simplicity, cheapness and thorough efficiency.

In the drawing, Figure 1 is a central longitudinal sectional view through a device constructed in accordance with the present invention, Fig. 2 is a transverse sectional view approximately on the line 2—2 of Fig. 1, Fig. 3 is a detail plan view looking toward the top end of the casing, the brush, as well as the protective cap or shell therefor being removed, Fig. 4 is an enlarged transverse sectional view approximately on the line 4—4 of Fig. 1, Fig. 5 is a perspective view of the brush, Fig. 6 is a central longitudinal sectional view illustrating the arrangement of parts when the plunger is actuated to force a quantity of paste through the outlet port of the casing and over the brush, Fig. 7 is an enlarged detail sectional view illustrating the position of the clutch member when the plunger is being moved toward the ported end of the casing, Fig. 8 is a similar sectional view illustrating the operation of the clutch member when the spring pressed stem is returned to its initial inoperative position, and Fig. 9 is a perspective view of the clutch.

In the embodiment of my invention as illustrated by the accompanying drawing, the handle 10 of my brush is in the nature of a tube or casing and has its closed end provided with an angularly disposed port 11. The said closed end of the casing is provided with a trough-shaped extension 12, the angular sides of which being provided with inturned spring flanges 13, the said flanges forming tongues which are adapted to be received in grooves 14 in the opposite sides of the head 15 of the removable brush member 16.

The port 11 is arranged approximately centrally of the trough-shaped extension 12, and the said port is normally closed by a flat valve 17 that is hingedly secured, as at 18, at the inner end of the trough, while the numeral 19 designates a spring which engages with the valve to normally swing the same to close the port. It will be noted, by reference to the drawing, that the inner end of the brush is disposed a suitable distance away from the port 11, and consequently from the valve 17, so that the free opening of the valve will not be interfered with by the brush, but as a matter of fact, the paste from the casing 10 will be directed over the inner face of the valve, when the same is moved to its open position and be thus directed to the bristles of the brush.

Within the casing 10 is arranged a plunger 20, the same having a peripheral groove within which is arranged a compressible gasket 20', and this gasket contacting with the bore of the casing will assist in holding the plunger against movement in the said casing, and the said gasket will afford an effective dam for the paste in the casing. The plunger 20 has arranged upon what I will term its outer face a clutch member 22. This clutch member is preferably constructed from a single strip of spring material which has its body portion slitted longitudinally adjacent to its edges and the metal between the slits bent outwardly at opposite angles to provide what I will term fingers which are indicated by the numerals 22'. The fingers do not have their ends contacting, but their ends are rounded, as at 22ª. The body of the member 22 has its opposite ends also bent angularly to provide spring arms 22ᵇ, and these arms normally contact at diametrically opposite points with the bore of the casing 10 so that the plunger will be held against movement in an outward direction from the casing, or in a direction toward the closed end of said casing.

To protect the fingers 22' as well as the arms 22ᵇ of the clutch member 22 I provide a guard member 23 which has its inner face concaved, as at 24 and which has its opposite ends notched longitudinally, as at 23ª, to receive the arms 22ᵇ of the clutch member. The guard member 23 as well as the plunger 22 are centrally provided with registering openings through which is passed an operating rod or stem 26 that has its inner end provided with a head 27 that is of a greater cross sectional diameter than the opening in the plunger member 20. The rod or stem 26 passes through a central opening in the closure cap 25 for the open end of the casing 10 and the said rod has its free end centrally connected to the closed end of a sleeve member 29. The member 29 may have its open end bent over the edge of the flanged cap 25 to prevent the removal of the sleeve from the casing 10.

The numeral 30 designates a helical spring which is arranged upon the portion of the stem projecting outwardly through the cap 25 and which exerts a pressure between the said cap and the closed end of the sleeve 29.

The stem 26 is provided with a flange or boss 31 that normally contacts with the inner face of the cap 25, thus limiting the outward movement of the sleeve 29 and consequently the outward movement of the stem 26.

A quantity of paste 35 is arranged between the plunger 20 and the ported end of the casing 10.

In operation the sleeve 29 is moved in the direction of and over the casing 1, thus projecting the stem 26 longitudinally within the casing. By reference to Fig. 8 of the drawing, it will be noted that the inner edges of the rounded ends of the fingers 22' of the clutch member just contact with the opposite sides of the stem 26, but the referred to inward movement of the said stem will cause a frictional engagement between the same and the rounded ends of the fingers 22 which, when forced to the position illustrated in Fig. 7 of the drawing, will be moved inwardly of the body of the clutch. It will be noted, by reference to Fig. 9, that the inner ends of the fingers 22' terminate at the juncture of the arms 22ᵇ with the body of the clutch, and consequently this frictional engagement between the stem and the said fingers will cause the shoulders provided by the said connection between the said fingers and arms to contact with the plunger 20, moving the arms inward out of frictional contact with the bore of the casing 10 and consequently permit of the advancement of the plunger and the clutch member, as well as the protective member 23 for the clutch in the direction of the ported end of the casing 10, at the same time projecting a quantity of paste through the port, the force of which causes the spring valve to swing to its open position and to direct the paste over the brush, as illustrated in Fig. 6 of the drawing. It should have been stated that the body of the clutch is bulged and the said shoulders 22ᶜ disposed at the juncture of the fingers 22' and the arms 22ᵇ are normally in contact with the outer face of the plunger, and when pressure upon the sleeve 29 is relieved and the plunger moves in the direction of the arrow, as illustrated in Fig. 8 of the drawing, the frictional contact between the stem 26 and the ends of the fingers 21' will permit of the swinging of the arms 22ᵇ of the clutch member 22 to again engage with the bore of the casing, while the compressible gasket 20' of the plunger 20 will tend to hold the said plunger against movement in an outward direction or in a direction away from the paste. When the plunger is to be entirely removed the cap 25 is unscrewed from the casing 10 and an outward movement of the said cap and the sleeve 29 will draw the head 27 of the stem 26 to contact with the inner face of the plunger 20 which may be thus readily removed from the casing, as will be understood to permit of the insertion of more paste within the casing. When the brush is not in action, the same may be protected by a reticulated cap 26', as disclosed in Fig. 1 of the drawing.

Having thus described the invention, what I claim is:

1. In a device for the purpose set forth, a hollow handle providing a paste receptacle, said handle having its closed end provided with an angular port, a spring pressed valve normally closing the port, a brush at the said closed end of the handle, a compressible gasket surrounding the plunger and engaging with the bore of the handle, a clutch member coöperating with the plunger and including a bowed spring plate provided with inturned angular fingers and outturned angular arms which normally contact with the bore of the handle, and a spring pressed stem passing centrally through the plunger and frictionally contacted by the ends of the fingers of the clutch, as and for the purpose set forth.

2. In a device for the purpose set forth, a hollow handle comprising a paste receptacle, said handle having its closed end provided with an inclined port, a brush upon the said closed end of the handle, a spring pressed valve between the said brush and the said end of the handle and normally closing the port at the handle, a plunger in the handle to contact with the paste, a clutch member for the plunger, said clutch comprising a bowed member provided with a central opening and with inturned angular fingers and with outturned angular arms at the juncture of the fingers with the body of the clutch and said arms frictionally engaging with the bore of the handle, a protective member for the clutch, a cap at the open end of the handle, a sleeve over the cap and slidable upon the handle, a stem centrally connected with the sleeve and projecting within the handle through the plunger and frictionally contacted by the fingers of the clutch member, said stem having its inner end provided with a head, a stop lug upon the stem normally contacting with the inner face of the cap, a spring surrounding the stem and disposed to exert a pressure upon the outer face of the cap and the said inner face of the sleeve.

In testimony whereof I affix my signature.

GEORGE L. BROWN.